Jan. 13, 1953     V. M. OLIVER     2,625,020

MIXING BOWL

Filed July 12, 1950

Virginia M. Oliver

INVENTOR.

BY *Clarence A. O'Brien*
*and Harvey B. Jackson*
Attorneys

Patented Jan. 13, 1953

2,625,020

UNITED STATES PATENT OFFICE 2,625,020

MIXING BOWL

Virginia M. Oliver, Tempe, Ariz., assignor of fifty per cent to John R. Oliver, Tempe, Ariz.

Application July 12, 1950, Serial No. 173,258

2 Claims. (Cl. 65—15)

1

The present invention relates to certain new and useful improvements in mixing bowls for household use and has more particular reference to a bowl in which a paddle, spoon or ladle may be manually activated.

It is a matter of common knowledge that a mixing bowl is sometimes difficult to manage in that it will slip and slide on the table or other surface while the housewife labors to whip the contents, especially if the latter be of a fairly heavy consistency. It is not uncommon to see the user of a mixing bowl clasping the bowl between the knees, holding it with the hand and arm against the chest or laboring in some other makeshift manner. Since it is often desirable to tilt the bowl in order to pool the contents for good agitation, it becomes a task indeed to catch hold of the rim with the pressure exerted by the thumb of one hand and to do the stirring and mixing with a spoon held in the other hand.

The obvious purpose of the instant invention is to provide a mixing bowl which has requisite facilities whereby same may be tilted and held securely with one hand through the medium of a well situated and formulated hand-grip which latter permits bowl handling and management with the greatest of ease and reliability.

Another object of the invention is to provide a simple, practical and effectually constructed mixing bowl in which manufacturers and users will find their primary requirements and needs fully met, contained and amply available.

Other objects and advantages will become more readily apparent from the following description and the accompanying sheet of illustrative drawings.

In the sheet of drawings, wherein like numerals are employed to designate like parts throughout the views.

Figure 1:
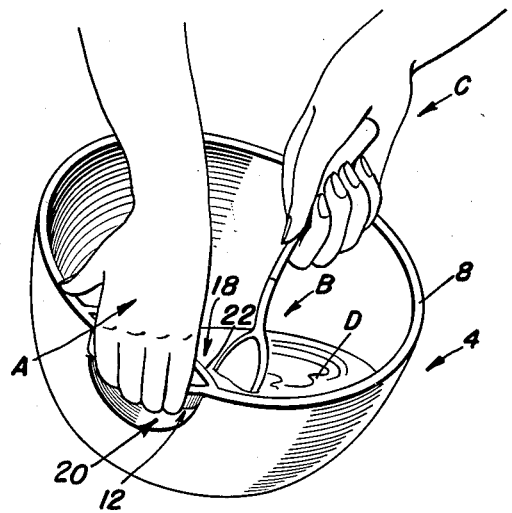
Figure 1 is a perspective view of a so-called hand-type mixing bowl embodying the subject matter of invention herein under advisement.
Figure 2:
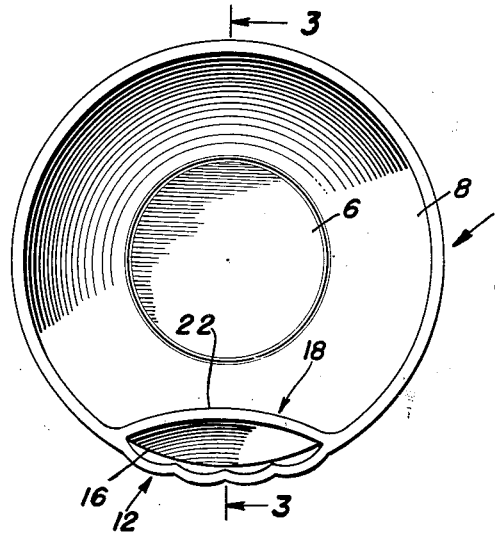
Figure 2 is a top plan view of the bowl.
Figure 3:
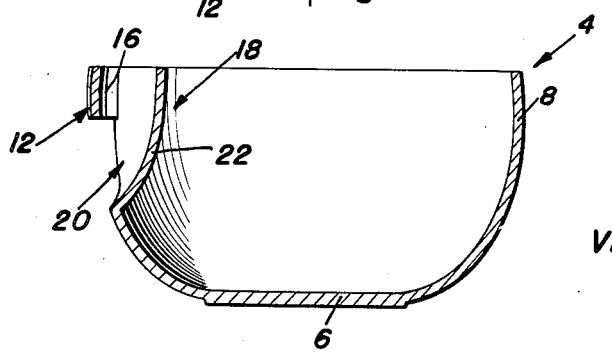
Figure 3 is a vertical central section on the plane of the line 3—3 of Figure 2 looking in the direction of the arrows.

Referring now to the drawings the bowl is denoted by the numeral 4 and it is of any appropriate material, size and shape. The shape shown may be considered as somewhat conventional for deep-well mixing bowls. More specifically, the one-piece bowl comprises a substantially flat circular or similar bottom wall 6 and an integral endless vertical side wall 8 which is attached to and rises from the marginal portions of the bottom wall and cooperates therewith in defining a receptacle. The side wall is concavo-convex and as clearly shown, a restricted portion of the upper edge portion of the side at the left in the drawings has a relatively small and shallow concavo-convex reentrant wall portion which may be referred to generally by the numeral 18. The convex side 22 of this reentrant wall portion faces and projects into the receptacle and cooperates in defining a finger receiving recess 20 as well as providing a finger protecting shield. There is a horizontal strip member 12 and this is integrated at its opposite ends with cooperating portions of the side wall and it spans the recess 20 and is spaced outwardly from the shield or reentrant wall 18. The strip member has its upper edge coplanar with the upper edge of the side wall 8 and has its lower edge spaced vertically above the lower portion of the reentrant wall as well as the recess 20 and cooperates with the latter features in defining a passageway as well as providing a hand grip. The hand grip is of a curvature compatibly congruent with the curvature of the wall 8 and is denoted by the numeral 12. It will be observed that this hand grip is suitably formed with corrugations 16 to facilitate the step in catching hold of the same safely and with desired reliability.

It will be seen that I have evolved and produced a simple, economical, practical and highly useful handle-equipped mixing bowl.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A mixing bowl for household and similar use comprising a one-piece bowl having a substantially flat horizontal bottom wall and an integral endless vertical side wall attached to and rising from said bottom wall and providing a receptacle, said side wall being concavo-convex and a restricted portion of the upper edge portion of said side wall having a relatively small and shallow concavo-convex re-entrant wall portion, the convex side of said re-entrant wall portion facing and projecting into said receptacle and providing a finger-receiving recess as well as a finger-protecting shield, and a horizontal strip member integrated at its opposite ends with cooperating portions of the side wall and spanning said recess and spaced from said shield, said strip member having an upper edge coplanar with the upper edge of said side wall and having a lower edge spaced vertically above the lower portion of said re-entrant wall portion and cooperating with the latter in providing a passageway, said strip member providing a hand-grip.

2. The structure specified in claim 1, wherein said strip member is of a lengthwise curvature compatibly congruent with the curvature of said side wall and being corrugated to provide finger-accommodating depressions.

VIRGINIA M. OLIVER.

REFERENCES CITED

The following references are of record in the file of this patent:

UNITED STATES PATENTS

| Number | Name | Date |
|---|---|---|
| D. 34,895 | McFaddin | Aug. 6, 1901 |
| 72,195 | Hailes | Dec. 17, 1867 |
| 193,804 | Burr | Aug. 7, 1877 |
| 262,580 | Dodds | Aug. 15, 1882 |
| 1,283,351 | Stone | Oct. 29, 1918 |
| 1,331,409 | Barnett | Feb. 17, 1920 |
| 1,882,198 | Slick | Oct. 11, 1932 |
| 2,121,165 | Slobodkin | June 21, 1938 |
| 2,170,311 | Smith | Aug. 22, 1939 |
| 2,369,728 | Farkas | Feb. 20, 1945 |
| 2,479,765 | Mower | Aug. 23, 1949 |

FOREIGN PATENTS

| Number | Country | Date |
|---|---|---|
| 26,004 | Great Britain | Nov. 10, 1909 |
| 28,934 | Denmark | May 28, 1910 |